(12) United States Patent
Tsuji et al.

(10) Patent No.: US 8,827,685 B2
(45) Date of Patent: Sep. 9, 2014

(54) NANO-IMPRINT MOLD

(75) Inventors: Yukihiro Tsuji, Yokohama (JP); Masaki Yanagisawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 319 days.

(21) Appl. No.: 13/169,139

(22) Filed: Jun. 27, 2011

(65) Prior Publication Data

US 2012/0003348 A1 Jan. 5, 2012

(30) Foreign Application Priority Data

Jul. 2, 2010 (JP) ................................. 2010-152360

(51) Int. Cl.
*B29C 59/02* (2006.01)
*B82Y 20/00* (2011.01)
*B29C 43/02* (2006.01)
*B29C 43/06* (2006.01)
*B29C 43/14* (2006.01)

(52) U.S. Cl.
CPC ............... *B82Y 20/00* (2013.01); *B29C 43/021* (2013.01); *B29C 2043/142* (2013.01); *B29C 43/06* (2013.01)
USPC ........ 425/385; 425/174; 425/174.4; 264/446; 264/447; 264/494

(58) Field of Classification Search
USPC ........ 425/174, 174.4, 385; 264/446, 447, 494
See application file for complete search history.

(56) References Cited

U.S. PATENT DOCUMENTS

| 2004/0191700 A1* | 9/2004 | Kuwabara et al. | 430/320 |
| 2007/0228610 A1* | 10/2007 | Sreenivasan et al. | 264/319 |
| 2009/0004320 A1* | 1/2009 | Ohashi et al. | 425/385 |
| 2009/0140458 A1* | 6/2009 | Xu et al. | 264/293 |

FOREIGN PATENT DOCUMENTS

| JP | 05232307 A * | 9/1993 | G02B 5/18 |
| JP | 2000-323461 | 11/2000 | |
| JP | 2008-100376 | 5/2008 | |
| JP | 2009-241330 | 10/2009 | |
| JP | 2010005972 A * | 1/2010 | |
| JP | 2010-030057 | 2/2010 | |

OTHER PUBLICATIONS

English machne translation of JP 2010-005972, retrieved from JPO database Jun. 5, 2013.*
English machne translation of JP 2000-323461, retrieved from JPO database Jun. 5, 2013.*
English Abstract of JP 05-232307, 1993.*
http://www.professionalplastics.com/professionalplastics/MechanicalPropertiesofPlastics.pdf (retrieved Jun. 5, 2013).*

(Continued)

*Primary Examiner* — Timothy Kennedy
(74) *Attorney, Agent, or Firm* — Smith, Gambrell & Russell LLP

(57) ABSTRACT

A nano-imprint mold includes a mold base; mold body having a first surface and a second surface opposite the first surface; and an elastic body disposed between a surface of the mold base and the first surface of the mold body, the elastic body being composed of resin. The second surface of the mold body is provided with a nano-imprint pattern. In addition, the elastic body has a bulk modulus lower than a bulk modulus of the mold body.

10 Claims, 13 Drawing Sheets

(56) References Cited

OTHER PUBLICATIONS http://www.shop3m.com/3m-double-coated-film-tape-9589-n2zbvz6q07.html (retrieved Jun. 5, 2013).*

M. Miller et al., "Fabrication of nanometer sized features on non-flat substrates using a nano-imprint lithography process", Proc. SPIE 5751 994, 2005, pp. 995-998.

Notification of Reasons for Rejection in corresponding Japanese Application No. 2010-152360, dated Feb. 12, 2014.

* cited by examiner

NANO-IMPRINT MOLD

BACKGROUND OF THE INVENTION

1. Field of the Invention

The present invention relates to nano-imprint molds.

2. Description of the Related Art

Japanese Unexamined Patent Application Publication No. 2000-323461 discusses a fine-pattern forming method by a nano-imprint technique. According to this method, a mold used for nano-imprinting is made of an optically transparent material so that a wafer and the mold can be aligned with each other.

"Fabrication of Nanometer Sized Features on Non-Flat Substrates Using a Nano-Imprint Lithography Process", M. Miller, et. al., Proc. SPIE 5751, 994, pp. 995-998 (2005) discusses a fine-processing method using a nano-imprint technique. In this fine-processing method, a step-and-repeat technique is used. The fine-processing method involves preparing a mold having a master transfer pattern, forming a resin portion composed of ultraviolet curing resin on a substrate to be fine-processed, pressing the mold against a predetermined region of the resin portion, curing the resin by irradiation of ultraviolet light, and detaching the mold from the resin layer. This series of steps is sequentially repeated on respective regions of the resin portion. Consequently, the master pattern of the mold is transferred to the resin portion.

SUMMARY OF THE INVENTION

Semiconductor optical devices have fine patterns. In order to manufacture such semiconductor optical devices, the use of a nano-imprint technique is under consideration. An example of a fine pattern in a semiconductor optical device includes a diffraction grating. A diffraction grating is, for example, included in a distributed feedback laser diode. A diffraction grating has periodic projections and recesses with a period of about 200 nm and a depth of about 50 to 300 nm. Using a nano-imprint technique to form such a fine pattern is advantageous in that the manufacturing cost of the device, such as a distributed feedback laser diode, can be reduced.

When a fine pattern of a semiconductor optical device is to be formed by a nano-imprint technique, a semiconductor layer in which the fine pattern is to be formed, and a resin layer are first formed in that order on a semiconductor substrate. At the same time, a mold having a predetermined fine pattern (i.e., projections and recesses) to be formed is prepared. Subsequently, the mold having the predetermined fine pattern is pressed against the resin layer, and the resin layer is cured in that state. Then, the mold is detached from the resin layer. Accordingly, the pattern (i.e., projections and recesses) formed in the mold is transferred to the resin layer. This transferring of the pattern formed in the mold to the resin layer is generally performed multiple times while changing the position where the nano-imprint process is to be performed (step-and-repeat technique). Specifically, the semiconductor layer is divided into multiple regions, and the pattern formed in the mold is sequentially transferred to the resin layer on the respective regions.

Subsequently, the semiconductor layer is etched by using the patterned resin layer as a mask. The original pattern including projections and recesses formed in the mold is transferred to the semiconductor layer.

When a fine pattern is to be formed by a nano-imprint technique in this manner, it is important that the surface of the semiconductor layer in which the fine pattern is to be formed and a pattern surface with projections and recesses formed in the mold be accurately faced parallel to each other before the mold is pressed against the resin layer. If the surface of the semiconductor layer and the pattern surface of the mold have poor parallelism therebetween, the thickness of the residual resin layer with the pattern of projections and recesses transferred thereto would not be uniform. For example, in forming a diffraction grating having projections and recesses with a constant height, the thickness of the patterned resin layer needs to be ideally uniform. However, if the surface of the semiconductor layer and the pattern surface of the mold have poor parallelism therebetween, the thickness of the residual resin layer would not be uniform. As a result, height of the projections and recesses of the diffraction grating would not be constant, and shape of the projections and recesses of the diffraction grating may also change. The shape and height (or depth) of the projections and recesses affect the properties of the diffraction grating, such as the reflection wavelength and the reflectivity of the diffraction grating. If the distributed feedback laser diode has a diffraction grating with a variation in the shape and height (or depth) of the projections and recesses, this variation in the shape and height (or depth) can lead to a variation or degradation in the properties of the distributed feedback laser diode. For this reason, the surface of the semiconductor layer and the pattern surface of the mold is accurately faced parallel to each other in the order of several nanometers before the mold is pressed against the resin layer.

However, the surface of the semiconductor substrate is not completely flat but has some unevenness in height, meaning that the surface of the semiconductor layer formed thereon is correspondingly uneven in height. Therefore, even if the surface of the semiconductor layer is aligned parallel to the pattern surface of the mold, the fine patterns formed on the semiconductor substrate would have non-uniformity in shape and height due to the surface roughness of the semiconductor substrate.

By the way, the silicon substrate has extremely flat surface compared to the group III-V compound semiconductor substrate. For example, the surface roughness of the silicon substrate is in the range of, for example, 1 to 1.5 nm. Therefore, the surface roughness of the substrate does not influence the shape of the fine patterns. However, with regard to a group III-V compound semiconductor substrate composed of, for example, InP or GaAs, the surface roughness of the substrate is as large as 10 nm. Therefore, the surface roughness influences the shape of the fine patterns when the fine patterns are made on the group III-V compound semiconductor substrate having such a large surface roughness. Japanese Unexamined Patent Application Publication No. 2000-323461 does not have any description regarding the problem of the variation in the shape of the fine patterns caused by poor flatness of the surface of the semiconductor substrate.

To reduce the variation in the shape of the fine patterns caused by the surface roughness of the semiconductor substrate described above, a step of pressing the mold firmly against the semiconductor substrate can be contained for forming the fine patterns. However, a semiconductor substrate, especially, a group III-V compound semiconductor substrate, generally breaks easily when the mold is firmly pressed against the substrate. In addition, a crystal defect, such as a dislocation, is probably introduced in the semiconductor substrate by pressing the mold firmly against the semiconductor substrate. Therefore, it is not preferable to include a step of pressing the mold firmly against the semiconductor substrate in forming the fine patterns.

A nano-imprint mold according to the present invention includes a mold base; a mold body having a first surface and a second surface opposite the first surface; and an elastic body disposed between a surface of the mold base and the first surface of the mold body, the elastic body being composed of resin. The second surface of the mold body is provided with a nano-imprint pattern. In addition, the elastic body has a bulk modulus lower than a bulk modulus of the mold body.

In the nano-imprint mold according to the present invention, the bulk modulus of the elastic body disposed between the mold base and the mold body is lower than the bulk modulus of the mold body. Therefore, when the second surface of the mold is pressed against a resin portion formed on a substrate in a nano-imprint process, the elastic body deforms so that the second surface of the mold becomes substantially parallel to the surface of the substrate. In other words, when the mold is pressed against the resin portion, the elastic body deforms so that the distance between the second surface of the mold and the surface of the substrate becomes substantially constant. Accordingly, even when the surface of the substrate is uneven in height, a fine pattern formed on the second surface of the mold body is exactly transferred to the resin portion without deformation or changing in the shape of the pattern.

Furthermore, the nano-imprint mold according to the present invention may further include a protrusion provided on the surface of the mold base. In addition, the protrusion has a smaller height than a distance from the surface of the mold base to the second surface of the mold body.

Furthermore, in the nano-imprint mold according to the present invention, the protrusion is preferably separated from the mold body and the elastic body. In addition, the protrusion is provided continuously along an outer edge of the mold base. The mold body and the elastic body are surrounded by the protrusion.

According to the nano-imprint mold in the embodiment, the protrusion protects the second surface of the mold body against damage in pressing the pattern surface on the resin portion. Furthermore, when the mold is pressed against the resin portion, the protrusion does not contact the surface of the resin portion. Therefore, the protrusion does not affect the resin patterns in the resin portion in pressing the pattern surface on the resin portion.

Furthermore, in the nano-imprint mold according to the present invention, the protrusion may be integrated with the mold base and the protrusion may be composed of the same material as the mold base.

Furthermore, the elastic body is preferably fixed between the surface of the mold base and the first surface of the mold body by using an adhesive material. In addition, the elastic body may be composed of a double coated adhesive tape, the double coated adhesive tape including an elastic film and an adhesive material on the both sides of the film. In this case, the elastic film is preferably composed of at least one of polyethylene terephthalate, polyethylene, and polypropylene.

Furthermore, in the nano-imprint mold according to the present invention, a thickness of the mold body from the first surface to the second surface is preferably in the range of 0.1 mm to 0.5 mm.

When the thickness of the mold body from the first surface to the second surface is 0.5 mm or smaller, the mold body can sufficiently bend when the mold is pressed against the resin portion. Therefore, the second surface of the mold becomes even more substantially parallel to the surface of the substrate. Accordingly, even when the surface of the substrate is uneven in height, a fine pattern formed on the second surface of the mold body is exactly transferred to the resin portion without deformation or changing in the shape of the pattern. If the thickness of the mold body from the first surface to the second surface is 0.1 mm or greater, deformation of the pattern in the second surface can be sufficiently reduced in pressing the mold against the resin portion. As a result, the fine pattern of the mold body is exactly transferred to the resin portion without deformation or changing in the shape of the pattern due to the bending of the mold body.

Furthermore, in the nano-imprint mold according to the present invention, the mold base and the mold body may be composed of quartz or synthetic quartz. In this case, the mold base and the mold body can optically transmit ultraviolet light. If ultraviolet curing resin is used as the resin portion, the ultraviolet light can be emitted from above the mold. In this case, the ultraviolet light emitted from above the mold travels through the mold so as to reach the resin portion.

Furthermore, in the nano-imprint mold according to the present invention, the elastic body is preferably composed of polyethylene terephthalate, polyethylene, or polypropylene. Furthermore, the elastic body may have a bulk modulus in the range of $1\times10^9$ Pa to $1\times10^{10}$ Pa. Furthermore, the nano-imprint pattern formed in the second surface of the mold body may be a diffraction grating pattern having periodic projections and recesses.

DESCRIPTION OF THE PREFERRED EMBODIMENTS

Figure 1:
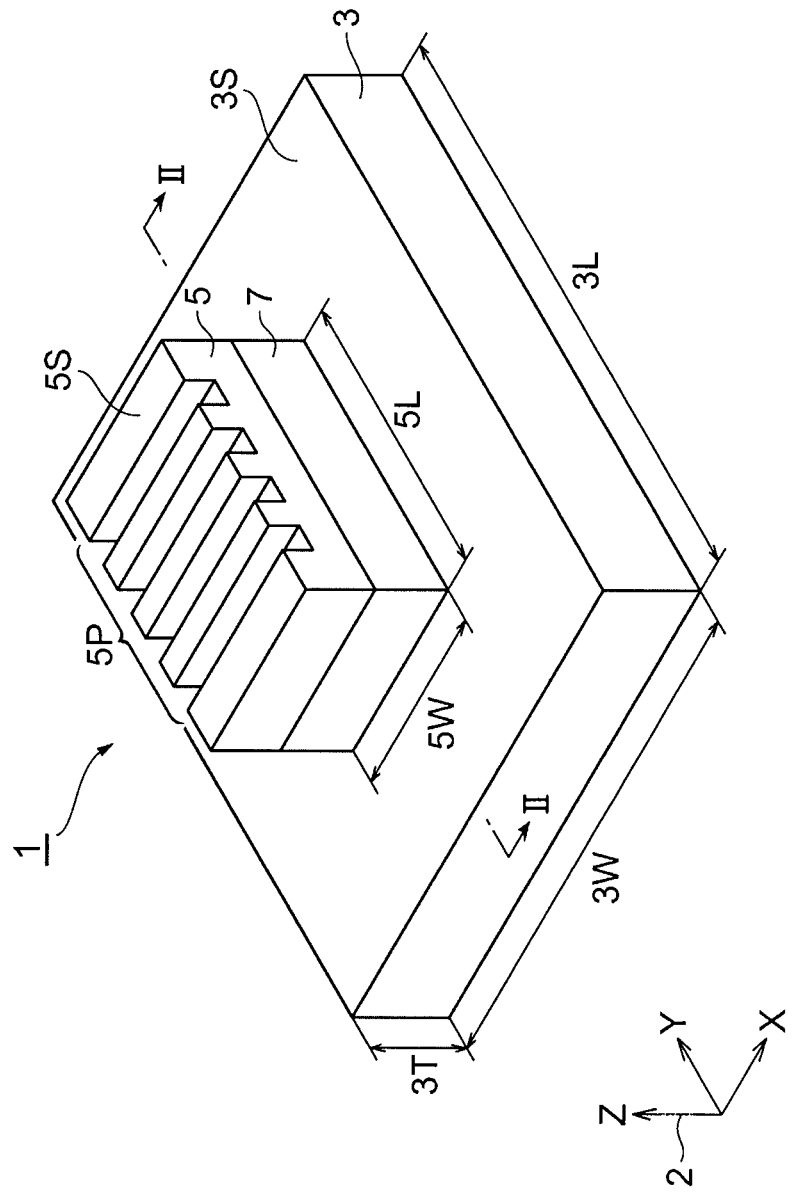
FIG. 1 is a perspective view of a nano-imprint mold according to a first embodiment.

A nano-imprint mold according to embodiments will be described below with reference to the attached drawings. In each of the drawings, the same reference numerals or characters are used for the same components, where possible.

Moreover, the dimensional ratios within and between the components are set to arbitrary values for easier understanding of the drawings.

First Embodiment

Figure 2:
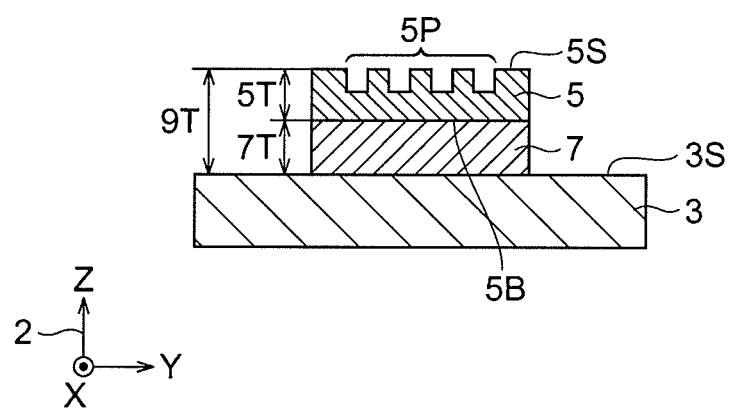
FIG. 2 is a cross-sectional view of the nano-imprint mold taken along line II-II in FIG. 1.

FIG. 1 is a perspective view of a nano-imprint mold according to a first embodiment. FIG. 2 is a cross-sectional view of the nano-imprint mold taken along line II-II in FIG. 1.

As shown in FIGS. 1 and 2, a nano-imprint mold 1 according to this embodiment includes a mold base 3, a mold body 5, and an elastic body 7 disposed between the mold base 3 and the mold body 5. In FIGS. 1 and 2, an orthogonal coordinate system 2 is shown.

In this embodiment, the mold base 3 is a rectangular plate with its thickness direction extending along a Z axis, and has a surface 3S extending along an X-Y plane. The mold base 3 is composed of, for example, quartz, synthetic quartz, silicon, nickel, or the like. If ultraviolet curing resin is to be used as a nano-imprint resin portion to be described later, the mold base 3 is preferably composed of a material with sufficient ultraviolet transmissivity, such as quartz or synthetic quartz.

For example, the mold base 3 has, for example, the following dimensions. The mold base 3 has a thickness 3T in the range of, for example, 0.6 mm to 10 mm in the Z-axis direction. The mold base 3 has a width 3W in the range of, for example, 60 mm to 150 mm in the X-axis direction, and has a length 3L in the range of, for example, 60 mm to 150 mm in the Y-axis direction.

In this embodiment, the mold body 5 is a rectangular plate with its thickness direction extending along the Z axis, and has an undersurface 5B (first surface) and a pattern surface 5S (second surface) that extend along the X-Y plane. The undersurface 5B faces the surface 3S of the mold base 3 with the elastic body 7 interposed therebetween. The pattern surface 5S is on the opposite side of the undersurface 5B of the mold body 5.

The pattern surface 5S is provided with a nano-imprint pattern 5P. In this embodiment, the pattern 5P is used for forming a diffraction grating included in a distributed feedback laser diode (DFB laser diode) or the like. Specifically, the pattern 5P in this embodiment has a plurality of line segments (projections) extending along the X axis, and a plurality of space segments (recesses) extending along the X axis. The projections and recesses have constant widths in the Y axis direction, respectively. In addition, the projections and recesses have a constant height or depth in the Z axis direction, respectively. Therefore, the pattern 5P is a uniform line-and-space pattern (grating pattern) in which the line segments and the space segments are alternately arranged in the Y-axis direction with a constant period.

The height of each of the line segments and the space segments in the Z-axis direction may be in the range of, for example, 50 nm to 300 nm. The width of each of the line segments and the space segments in the Y-axis direction may be in the range of, for example, 50 nm to 300 nm. The period of the line-and-space pattern (pattern 5P) may be in the range of, for example, 200 nm to 250 nm. The sum of the width of one line segment in the Y-axis direction and the width of one space segment in the Y-axis direction corresponds to the period of the line-and-space pattern. The period of the line-and-space pattern (pattern 5P) is related to a reflection wavelength band of a diffraction grating.

The mold body 5 is composed of, for example, quartz, synthetic quartz, silicon, or the like. If ultraviolet curing resin is to be used as the nano-imprint resin portion to be described later, the mold body 5 is preferably composed of a material with sufficient ultraviolet transmissivity, such as quartz or synthetic quartz. The material used for forming the mold body 5 may be the same as or different from that of the mold base 3.

For example, the mold body 5 has a width 5W and a length 5L with the following values, for example. The width 5W of the mold body 5 in the X-axis direction is in the range of, for example, 10 mm to 25 mm. The length 5L of the mold body 5 in the Y-axis direction is in the range of, for example, 10 mm to 25 mm. A thickness 5T of the mold body 5 in the Z-axis direction preferably is in the range of 0.1 mm to 0.5 mm.

The elastic body 7 is disposed between the surface 3S of the mold base 3 and the undersurface 5B of the mold body 5. The elastic body 7 has a lower bulk modulus than a bulk modulus of the mold body 5. The elastic body 7 is composed of, for example, resin such as polyethylene terephthalate (PET), polyethylene, and polypropylene. Furthermore, the bulk modulus of the elastic body 7 is preferably lower than the bulk modulus of the mold base 3. If ultraviolet curing resin is to be used as the nano-imprint resin portion to be described later, the elastic body 7 is preferably composed of a material with sufficient ultraviolet transmissivity, such as polyethylene terephthalate (PET), polyethylene, and polypropylene.

The elastic body 7 is fixed between the surface 3S of the mold base 3 and the undersurface 5B of the mold body 5 by using an adhesive material (not shown). The elastic body 7 is constituted of, for example, a double coated adhesive tape. The double coated adhesive tape includes an elastic film and an adhesive material on the both sides of the film. The elastic film is composed of, for example, resin, such as polyethylene terephthalate, polyethylene, and polypropylene. These resins have high ultraviolet transmissivity for ultraviolet (UV) light. If the elastic body 7 has adhesion properties, the elastic body 7 can be fixed between the surface 3S of the mold base 3 and the undersurface 5B of the mold body 5 without an adhesive material.

A thickness 7T of the elastic body 7 in the Z-axis direction preferably is in the range of 10 μm to 200 μm. The sum of the thickness 7T of the elastic body 7 and the thickness 5T of the mold body 5 may be in the range of, for example, 0.11 mm to 0.7 mm. The sum of the thickness 7T and the thickness 5T corresponds to a distance 9T from the surface 3S of the mold base 3 to the pattern surface 5S of the mold body 5.

Next, a method of forming a fine pattern by a nano-imprint technique using the mold 1 according to this embodiment will be described.

Figure 3:
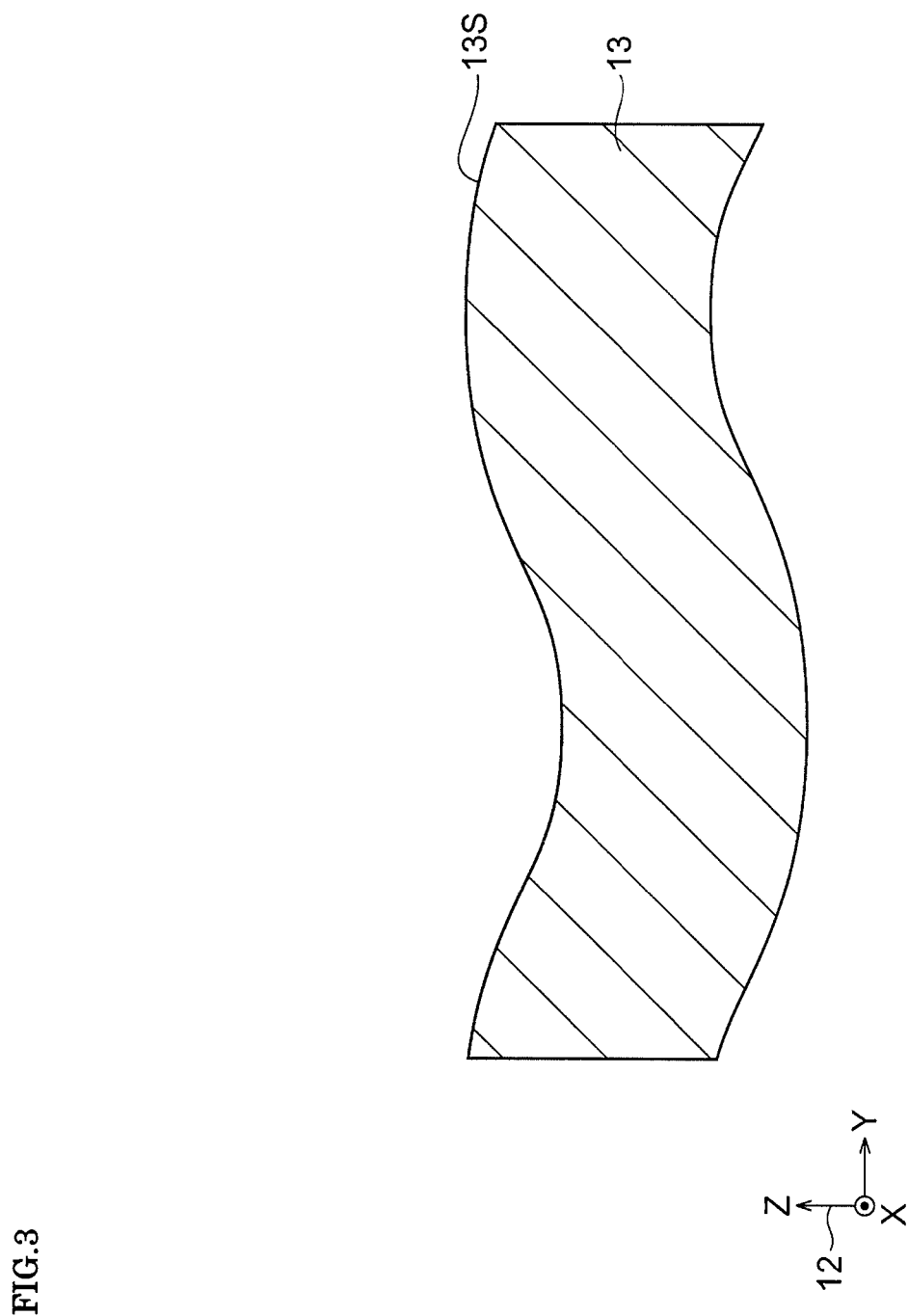
FIG. 3 is a cross-sectional view for explaining a method of forming a fine pattern by a nano-imprint technique using the mold according to the first embodiment.
Figure 4:
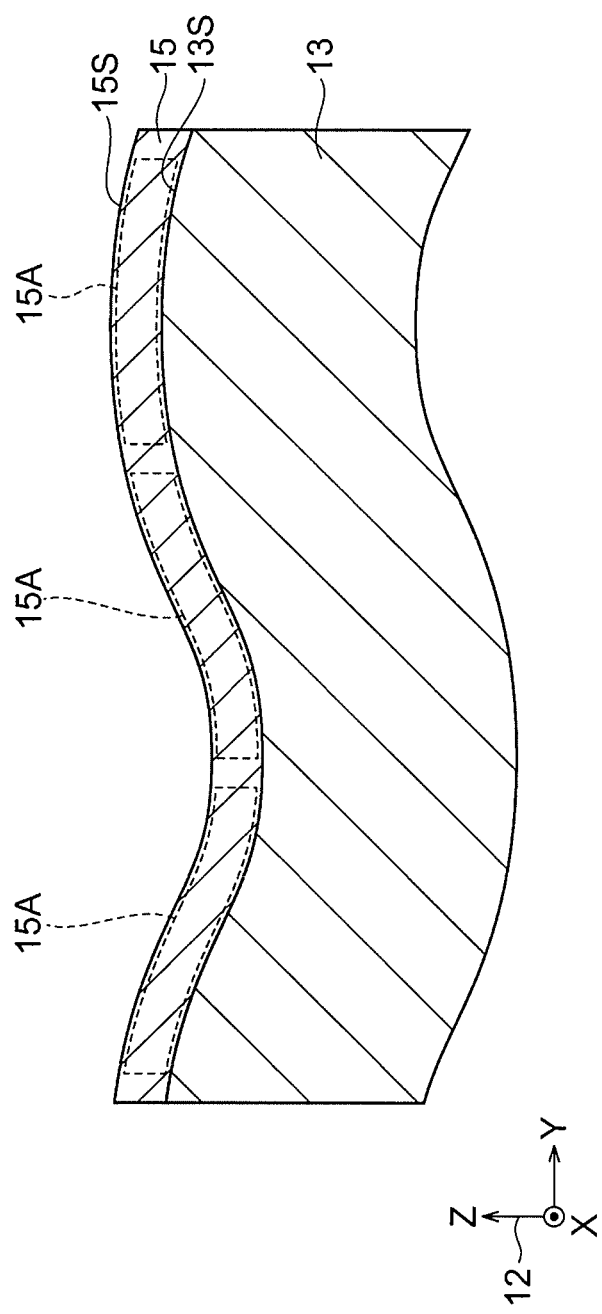
FIG. 4 is another cross-sectional view for explaining the method of forming a fine pattern by a nano-imprint technique using the mold according to the first embodiment.
Figure 5:
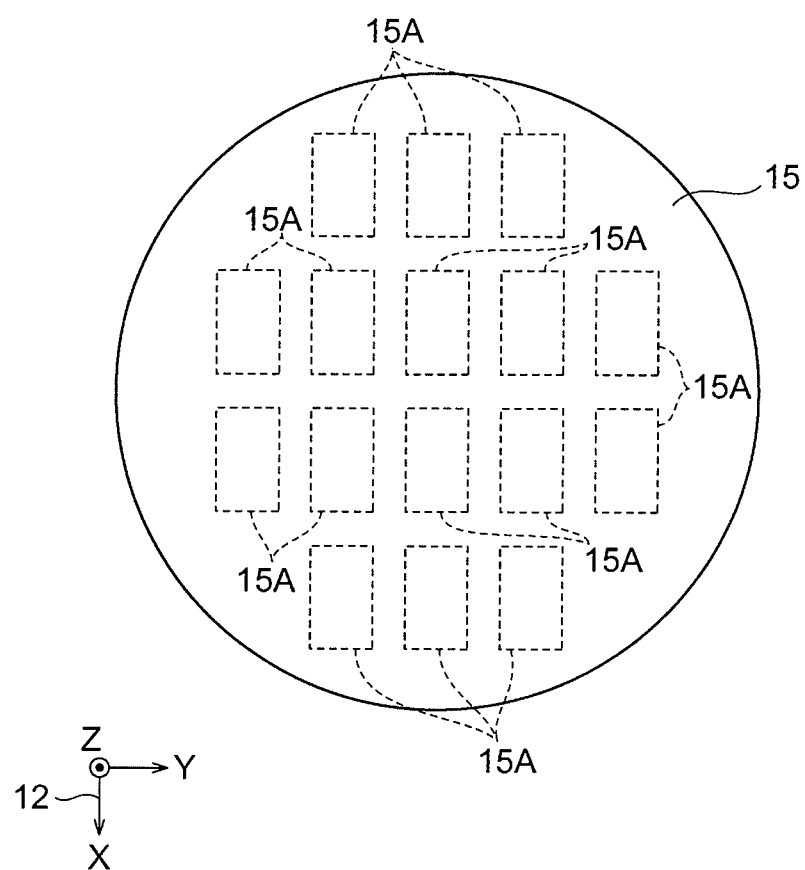
FIG. 5 is a plan view for explaining the method of forming a fine pattern by a nano-imprint technique using the mold according to the first embodiment.

FIGS. 3, 4, and 6 to 11 are cross-sectional views for explaining the method of forming a fine pattern by a nano-imprint technique using the mold 1 according to this embodiment. FIG. 5 is a plan view for explaining the method of forming a fine pattern by a nano-imprint technique using the mold 1 according to this embodiment.

Specifically, a method of forming a diffraction grating as a fine pattern in a semiconductor layer on a semiconductor substrate will be described. An example of such a diffraction grating includes a diffraction grating included in a semiconductor optical device, such as a distributed feedback laser diode.

First, referring to FIG. 3, a semiconductor substrate 13 is prepared. The semiconductor substrate 13 may be, for example, a disk-shaped substrate. The semiconductor substrate 13 has a surface 13S that is not completely flat but has some unevenness in height or undulation. In FIG. 3 and onward, the uneven height of the surface 13S is shown in an emphasized manner. The semiconductor substrate 13 is composed of, for example, a single-element semiconductor, such as silicon or germanium, or a compound semiconductor, e.g., a group III-V compound semiconductor, such as indium phosphide (InP) and gallium arsenide (GaAs).

If the semiconductor substrate 13 is composed of a single-element semiconductor, such as silicon, the semiconductor substrate 13 has a surface 13S with relatively small unevenness in height. In this case, the unevenness in height is in the range of, for example, about 1.0 nm to 1.5 nm in terms of a root-mean-square (RMS) value.

On the other hand, if the semiconductor substrate 13 is composed of a compound semiconductor, e.g., a group III-V compound semiconductor, such as InP and GaAs, the semiconductor substrate 13 generally has a surface 13S with a large unevenness in height. In this case, the unevenness in height is in the range of, for example, about 9 nm to 10 nm in terms of a root-mean-square (RMS) value.

Subsequently, referring to FIGS. 4 and 5, a semiconductor layer 15 is formed on the surface 13S of the semiconductor substrate 13. A surface 15S of the semiconductor layer 15 has a similar unevenness in height to the surface 13S of the semiconductor substrate 13. The semiconductor layer 15 is divided into a plurality of regions 15A. In a subsequent process, the mold 1 sequentially transfers patterns to a resin portion on the respective regions 15A (step-and-repeat technique).

Subsequently, referring to FIG. 6, a resin portion 17 composed of ultraviolet curing resin or thermoplastic resin is formed on the surface 15S of the semiconductor layer 15. The resin portion 17 may be formed by, for example, applying the ultraviolet curing resin or thermoplastic resin onto the surface 15S of the semiconductor layer 15 by a falling-drop method or a spill coating method. The resin portion 17 formed on the surface 15S of the semiconductor layer 15 has fluidity in the state shown in FIG. 6.

Figure 6:
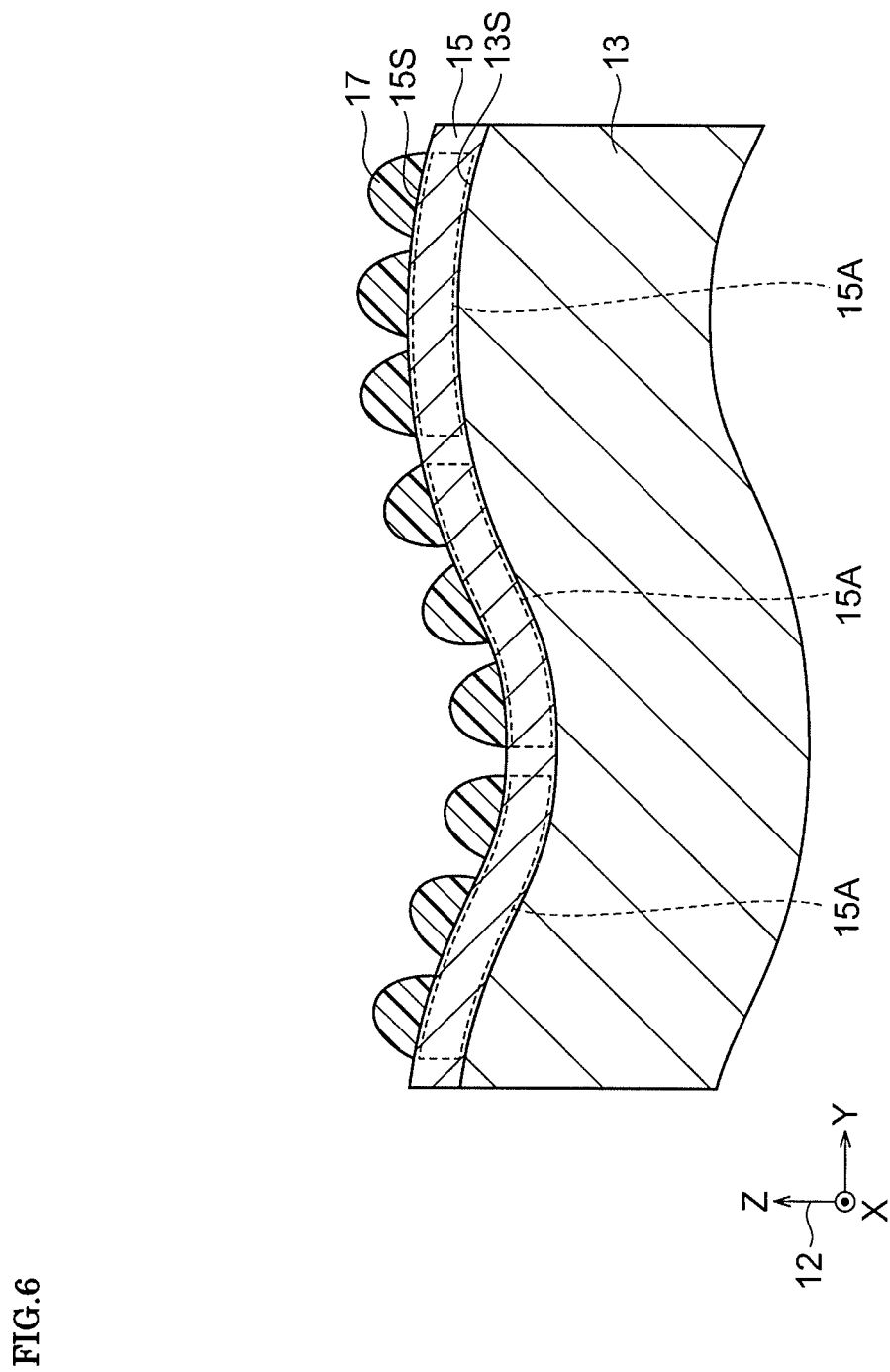
FIG. 6 is another cross-sectional view for explaining the method of forming a fine pattern by a nano-imprint technique using the mold according to the first embodiment.

As shown in FIG. 6, the resin portion 17 may have a droplet shape and be distributed over the surface 15S of the semiconductor layer 15 in a state where the resin portion 17 is divided into multiple parts. Alternatively, the resin portion 17 may be provided in the form of a layer that covers the entire surface 15S of the semiconductor layer 15. Furthermore, an adhesive layer so as to enhance the adhesiveness between the semiconductor layer 15 and the resin portion 17 may be interposed between the semiconductor layer 15 and the resin portion 17.

Figure 7:
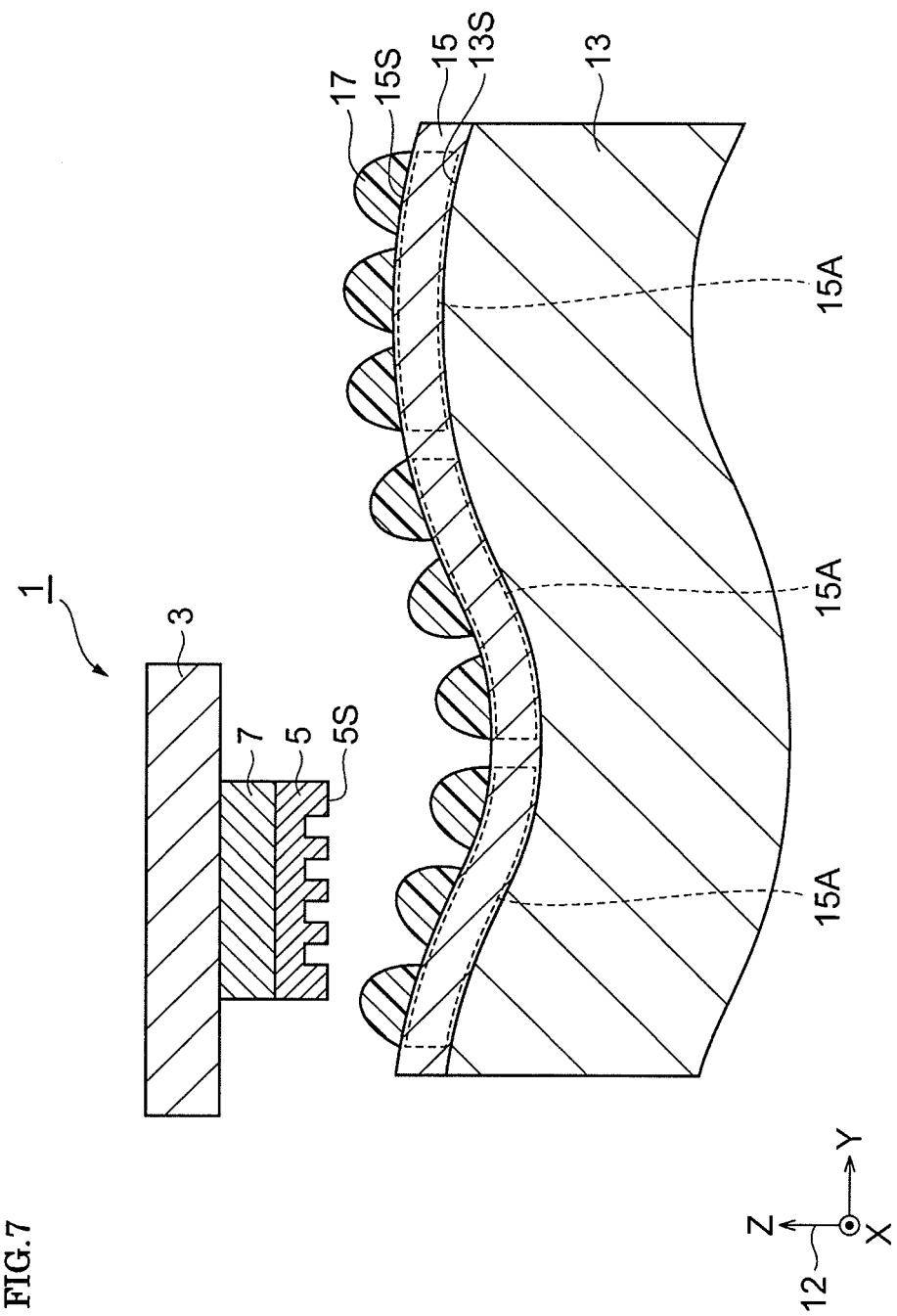
FIG. 7 is another cross-sectional view for explaining the method of forming a fine pattern by a nano-imprint technique using the mold according to the first embodiment.

Subsequently, referring to FIG. 7, the surface 15S in one of the regions 15A of the semiconductor layer 15 is faced toward the pattern surface 5S of the mold 1. In this case, an average surface of the overall surface 15S of the semiconductor layer 15 is set substantially parallel to the pattern surface 5S of the mold body 5. FIG. 7 shows an orthogonal coordinate system 12 in which the Z axis is set parallel to the thickness direction of the semiconductor substrate 13, and the X and Y axes are set parallel to an average surface of the overall surface 13S of the semiconductor substrate 13. In the state shown in FIG. 7, the pattern surface 5S of the mold body 5 is substantially parallel to the X-Y plane. Because the surface 15S of the semiconductor layer 15 has the aforementioned uneven height, the pattern surface 5S of the mold body 5 and the surface 15S of the region 15A are not parallel to each other due to undulation or unevenness in height in the surface 15S.

Subsequently, referring to FIG. 8, the mold 1 is moved in the Z-axis negative direction so that the pattern surface 5S of the mold body 5 is pressed against the resin portion 17 on the aforementioned region 15A. In pressing the pattern surface 5S of the mold body 5 on the resin portion 17, the mold body 5 does not come into contact with the semiconductor layer 15. The elastic body 7 has a lower bulk modulus than that of the mold body 5. Therefore, the elastic body 7 deforms so that the pattern surface 5S of the mold 1 becomes substantially parallel to the surface 15S of the region 15A. In other words, when the pattern surface 5S of the mold 1 is pressed against the resin portion 17 on the region 15A, the elastic body 7 deforms so that the distance between the pattern surface 5S of the mold 1 and the surface 15S of the region 15A becomes substantially constant.

In this state, the resin portion 17 on the surface 15S of the region 15A is cured. When the resin portion 17 is composed of ultraviolet curing resin, ultraviolet light is emitted to the resin portion 17. The mold 1 is preferably composed of a material with sufficient ultraviolet transmissivity, such as quartz. In this case, the ultraviolet light can be emitted on the surface of the resin portion 17 through the mold 1.

Subsequently, referring to FIG. 9, the mold 1 is detached from the resin portion 17. Accordingly, a resin pattern 17P is formed in the resin portion 17 on the region 15A of the semiconductor layer 15.

Figure 8:
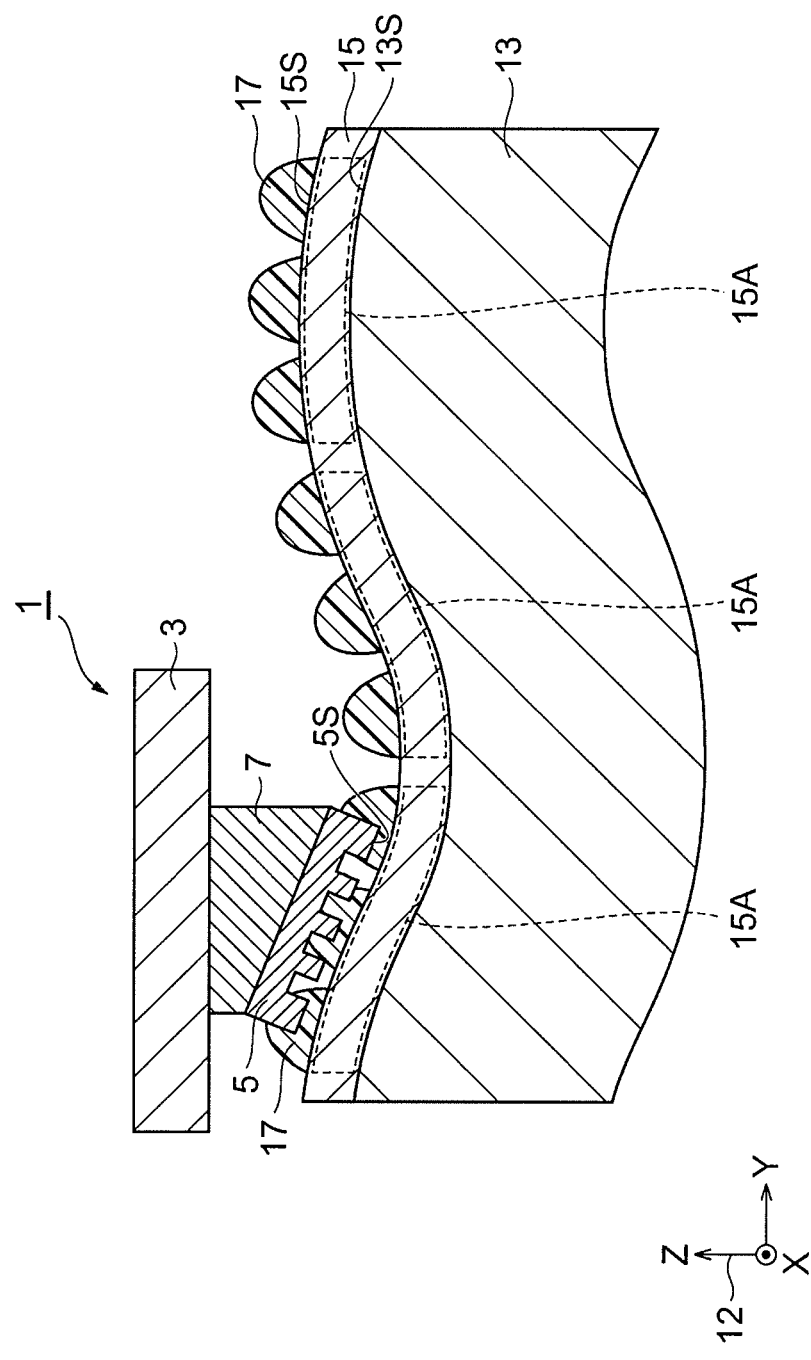
FIG. 8 is another cross-sectional view for explaining the method of forming a fine pattern by a nano-imprint technique using the mold according to the first embodiment.
Figure 9:
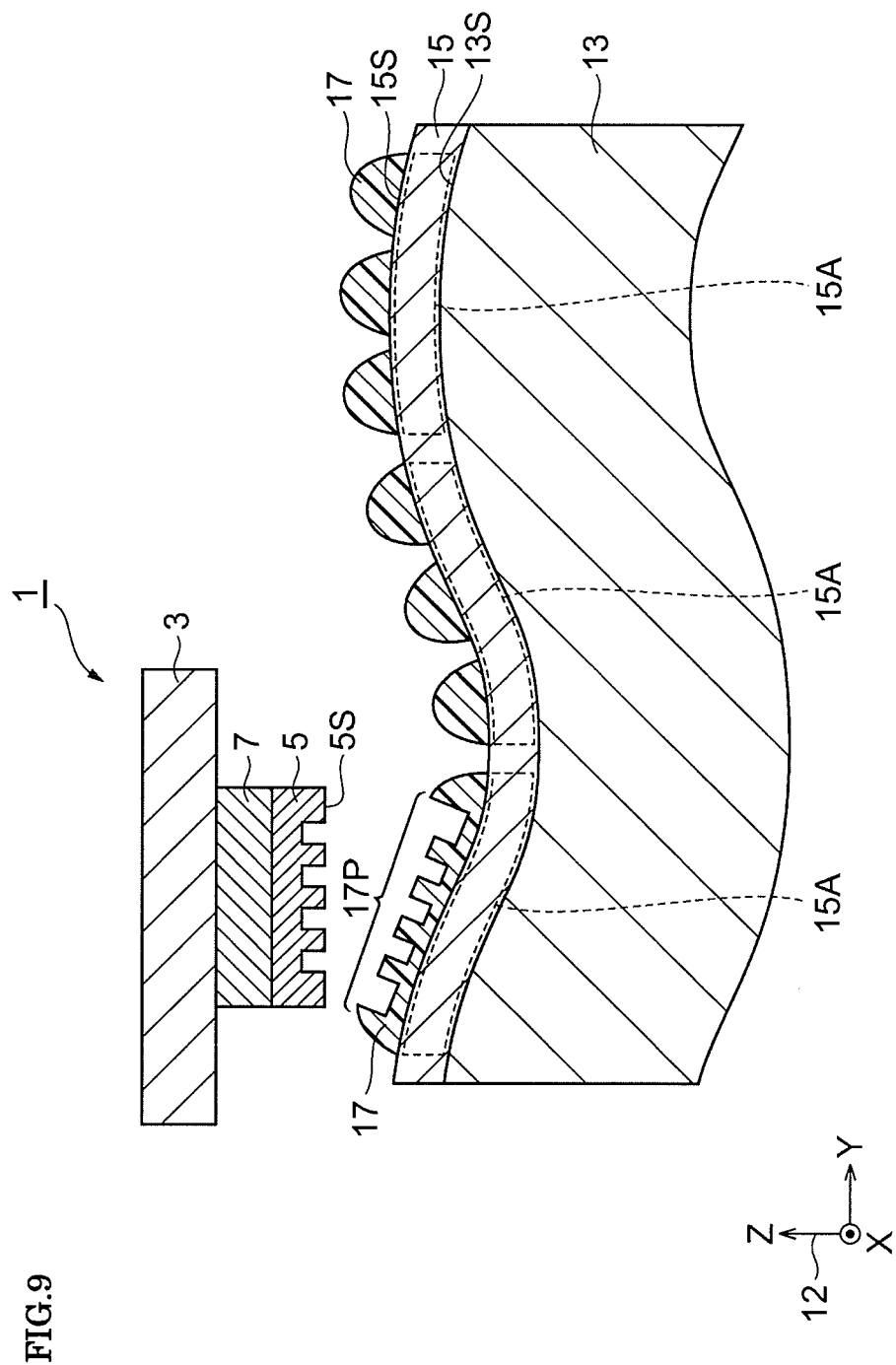
FIG. 9 is another cross-sectional view for explaining the method of forming a fine pattern by a nano-imprint technique using the mold according to the first embodiment.
Figure 10:
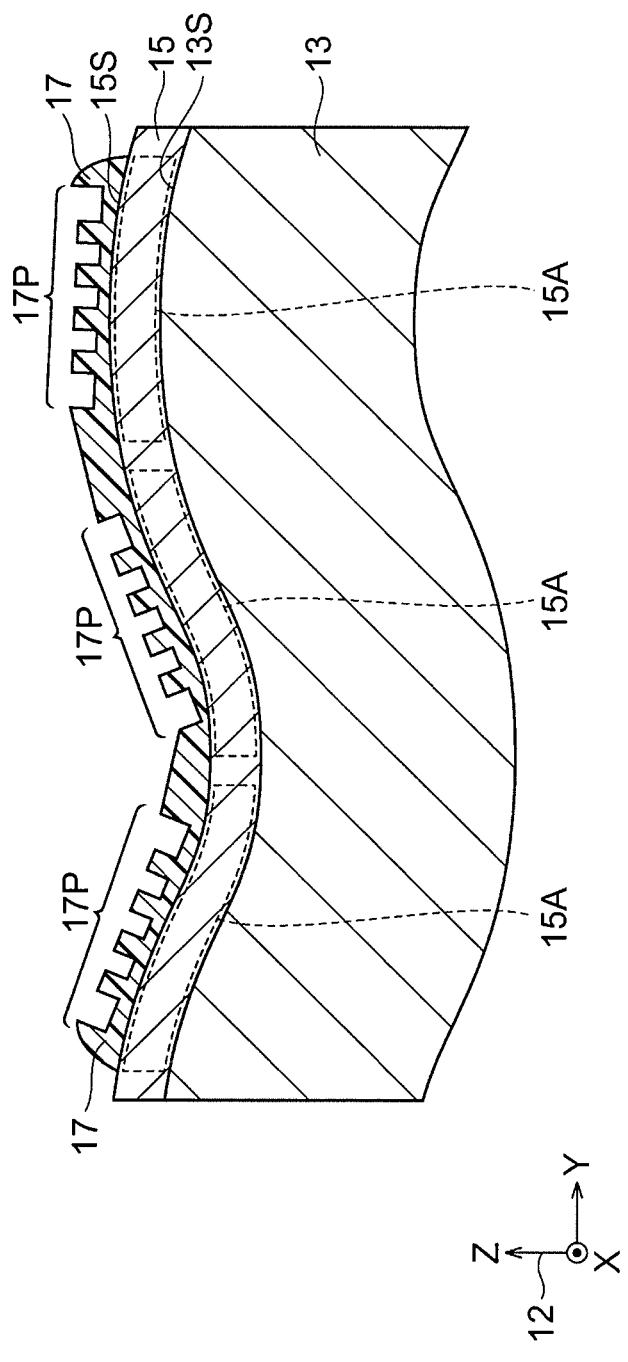
FIG. 10 is another cross-sectional view for explaining the method of forming a fine pattern by a nano-imprint technique using the mold according to the first embodiment.

Referring to FIG. 10, the series of steps shown in FIGS. 7 to 9 is sequentially repeated for the resin portion 17 on other regions 15A of the semiconductor layer 15 by a step-and-repeat technique. Accordingly, resin patterns 17P are formed as fine patterns in the resin portion 17 on the respective regions 15A of the semiconductor layer 15. Each of the resin patterns 17P is a pattern having the pattern 5P (grating pattern) of the mold body 5 transferred thereto.

Figure 11:
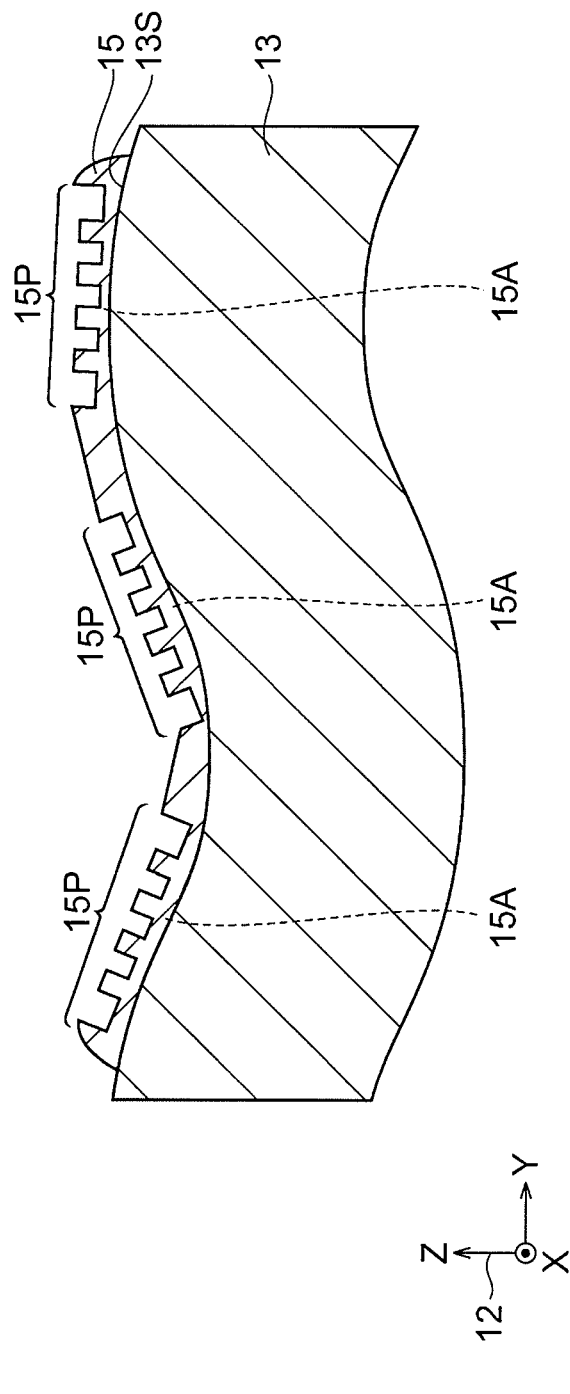
FIG. 11 is another cross-sectional view for explaining the method of forming a fine pattern by a nano-imprint technique using the mold according to the first embodiment.

Subsequently, the semiconductor layer 15 is etched through the resin portion 17 provided with the resin patterns 17P as an etching mask by, for example, reactive ion dry etching (RIE) process. Specifically, resin portion 17 is etched until the surface of the semiconductor layer 15 is exposed. The surface of the semiconductor layer 15 is exposed at an area of the recesses in the resin patterns 17P at which the thickness of the resin portion 17 is thin. After etching the resin portion 17, the resin portion 17 also has the resin patterns 17P. Then, the semiconductor layer 15 is etched through the patterned resin portion 17 having the resin patterns 17P as an etching mask to form the diffraction gratings 15P. Therefore, as shown in FIG. 11, the resin patterns 17P can be transferred to the semiconductor layer 15. Accordingly, diffraction gratings 15P exactly transferred from the pattern 5P (grating pattern) of the mold body 5can be formed in the semiconductor layer 15.

In the mold 1 according to this embodiment described above, the elastic body 7 fixed between the mold base 3 and the mold body 5 has a lower bulk modulus than a bulk modulus of the mold body 5. Therefore, when the pattern surface 5S of the mold 1 is pressed against the resin portion 17, the elastic body 7 deforms so that the pattern surface 5S of the mold 1 becomes substantially parallel to the surface 15S of the region 15A (see FIG. 8). In other words, when the mold 1 is pressed against the resin portion 17, the elastic body 7 deforms so that the distance between the pattern surface 5S of the mold 1 and the surface 15S of the region 15A becomes substantially constant (see FIG. 8).

Accordingly, even when the semiconductor layer 15 has an uneven surface in height, the pattern 5P (grating pattern) of the mold body 5 is exactly transferred to the resin portion 17 without deformation or changing in the shape of the pattern (see FIG. 10). The diffraction gratings 15P is formed by etching the semiconductor layer 15 through the patterned resin portion 17 as an etching mask. As a result, the diffraction gratings 15P having the same grating pattern as the grating pattern 5P of the mold body 5 can be formed in the semiconductor layer 15 without changing in the shape of the pattern (see FIG. 11).

Furthermore, in the mold 1 according to this embodiment, the thickness 5T of the mold body 5 is in the range of 0.1 mm to 0.5 mm (see FIG. 2).

If the thickness 5T of the mold body 5 is 0.5 mm or smaller, the mold body 5 can sufficiently bend when the mold 1 is pressed against the resin portion 17. Therefore, the pattern surface 5S of the mold 1 becomes even more substantially parallel to the surface 15S of the corresponding region 15A of the semiconductor layer 15 in pressing against the resin portion 17 (see FIG. 8). Accordingly, even when the semiconductor layer 15 has an uneven surface in height, the pattern 5P (grating pattern) of the mold body 5 is further exactly transferred to the resin portion 17 (see FIG. 10). As a result, the diffraction gratings 15P having the same grating pattern as the grating pattern 5P can be also formed in the semiconductor layer 15, steadily (see FIG. 11).

If the thickness 5T of the mold body 5 is 0.1 mm or greater, deformation of the pattern 5P in the pattern surface 5S can be sufficiently reduced in pressing the mold 1 against the resin portion 17 (see FIG. 8). As a result, the pattern 5P (grating pattern) of the mold body 5 is exactly transferred to the resin portion 17 without deformation or changing in the shape of the pattern due to the bending of the mold body 5 (see FIG. 10). Consequently, the diffraction gratings 15P exactly transferred from the grating pattern 5P of the mold body 5 can be formed without deformation or changing in the shape (see FIG. 11).

The elastic body 7 preferably has a bulk modulus in the range of $1\times10^9$ Pa to $1\times10^{10}$ Pa. By setting the bulk modulus of the elastic body 7 to $10^9$ Pa or higher, the elastic body 7 can easily recover its original state after being compressed in the imprint process. In other words, the mold 1 equipped with the elastic body 7 can be used over and over again. On the other hand, by setting the bulk modulus of the elastic body 7 to $10^{10}$ Pa or lower, the elastic body 7 can easily deform so as to conform to the shape of the surface of the semiconductor substrate 13. As a result, deformation or changing in the shape of the fine pattern can be prevented in a nano imprint process even when the semiconductor layer 15 has an uneven surface in height.

Furthermore, the elastic body 7 preferably has a thickness in the range of 10 μm to 200 μm. Setting the thickness of the elastic body 7 to 10 μm or greater is advantageous in that the elastic body 7 is sufficiently deformable relative to the undulation or unevenness in height at the substrate surface.

Second Embodiment

Figure 12:
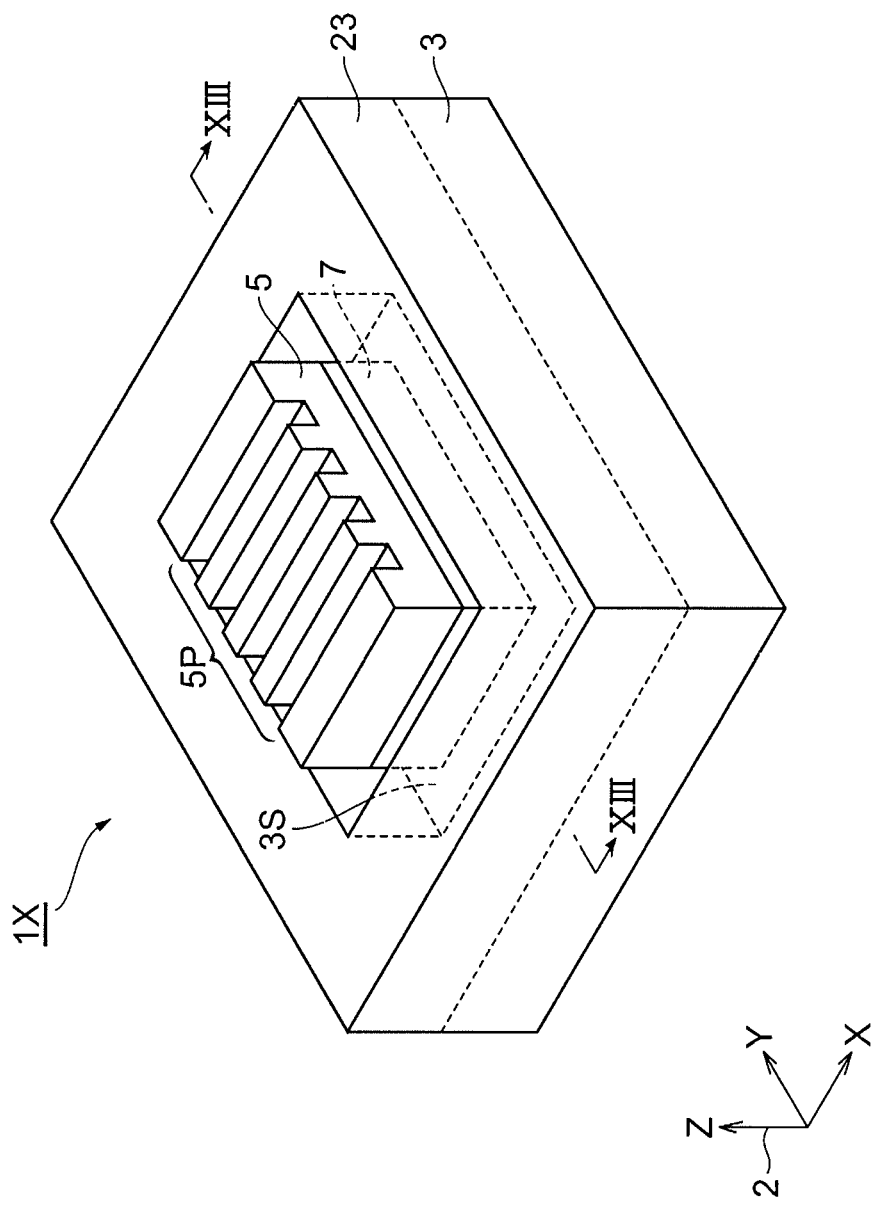
FIG. 12 is a perspective view of a nano-imprint mold according to a second embodiment.
Figure 13:
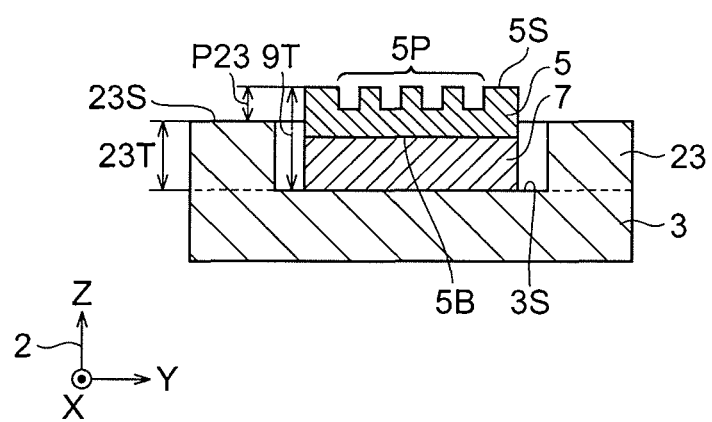
FIG. 13 is a cross-sectional view of the nano-imprint mold taken along line XIII-XIII in FIG. 12.

Next, a nano-imprint mold according to a second embodiment will be described. FIG. 12 is a perspective view of the nano-imprint mold according to this embodiment. FIG. 13 is a cross-sectional view of the nano-imprint mold taken along line XIII-XIII in FIG. 12.

A nano-imprint mold 1x according to this embodiment shown in FIGS. 12 and 13 differs from the mold 1 according to the first embodiment in additionally having a protrusion 23.

The mold 1x according to this embodiment includes the protrusion 23 provided on the surface 3S of the mold base 3. As viewed in the thickness direction of the mold base 3, the protrusion 23 in this embodiment is separated from the mold body 5 and the elastic body 7. Moreover, the protrusion 23 is provided continuously along the outer edges of the mold base 3. The mold body 5 and the elastic body 7 are surrounded by the protrusion 23. The protrusion 23 is fixed to the mold base 3.

In this embodiment, the protrusion 23 is composed of the same material as the mold base 3 and is integrated with the mold base 3. In FIGS. 12 and 13, the boundary between the protrusion 23 and the mold base 3 is shown with a dotted line. Alternatively, the protrusion 23 may be composed of a material different from that of the mold base 3. Examples of such a material include quartz, synthetic quartz, nickel, and silicon. Furthermore, the protrusion 23 does not necessarily have to be integrated with the mold base 3. In that case, the protrusion 23 and the mold base 3 are formed separately, and the protrusion 23 is subsequently fixed to the mold base 3.

The protrusion 23 has a height 23T smaller than the distance 9T from the surface 3S of the mold base 3 to the pattern surface 5S of the mold body 5. Therefore, when the mold 1x is pressed against the resin portion 17 on the semiconductor layer 15, the protrusion 23 does not contact the surface of the resin portion 17.

The height 23T of the protrusion 23 is in the range of, for example, 0.4 mm to 0.9 mm. A difference P23 between the distance 9T from the surface 3S of the mold base 3 to the pattern surface 5S of the mold body 5 and the height 23T of the protrusion 23 is in the range of, for example, 0.1 mm to 0.5 mm. The distances between the protrusion 23 and the mold body 5 in the X-axis and Y-axis directions are in the range of, for example, 1 mm to 2 mm, respectively.

The mold 1x according to this embodiment described above has a similar features to the mold 1 according to the first embodiment. When the surface 15S of the semiconductor layer 15 is uneven in height, the pattern 5P (grating pattern) of the mold body 5 is exactly transferred to the resin portion 17 without deformation or changing in the shape of the pattern (see FIG. 10). The semiconductor layer 15 is etched through the patterned resin portion 17 having the resin patterns 17P as an etching mask to form the diffraction gratings 15P. Therefore, as shown in FIG. 11, the resin patterns 17P can be transferred to the semiconductor layer 15. Accordingly, diffraction gratings 15P exactly transferred from the pattern 5P (grating pattern) of the mold body 5 can be formed in the semiconductor layer 15.

Furthermore, the mold 1x according to this embodiment described above further includes the protrusion 23 provided on the surface 3S of the mold base 3. The protrusion 23 has the height 23T smaller than the distance 9T from the surface 3S of the mold base 3 to the pattern surface 5S of the mold body 5 (see FIGS. 12 and 13). Therefore, the protrusion 23 protects the pattern surface 5S of the mold body 5 against damage in pressing the pattern surface 5S on the resin portion 17. Furthermore, when the mold 1x is pressed against the resin portion 17 on the semiconductor layer 15, the protrusion 23 does not contact the surface of the resin portion 17. Therefore, the protrusion 23 does not affect the resin patterns 17P in the resin portion 17 in pressing the pattern surface 5S on the resin portion 17.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A nano-imprint mold comprising:
   a mold base;
   a mold body having a first surface and a second surface opposite the first surface;
   an elastic body disposed between a surface of the mold base and the first surface of the mold body, the elastic body being composed of resin; and a protrusion provided on the surface of the mold base, the protrusion being separated from the mold body and the elastic body, wherein the second surface of the mold body is provided with a nano-imprint pattern, the elastic body has a bulk modulus lower than a bulk modulus of the mold body, and the protrusion is continuous, and provides a portion of all outer edges of the mold base to thereby continuously surround the mold body and the elastic body.

2. The nano-imprint mold according to claim 1, wherein the protrusion has a height that is smaller than a distance from the surface of the mold base to the second surface of the mold body.

3. The nano-imprint mold according to claim 1, wherein the protrusion is integrated with the mold base and the protrusion is composed of the same material as the mold base.

4. The nano-imprint mold according to claim 1, wherein the elastic body is fixed between the surface of the mold base and the first surface of the mold body by using an adhesive material.

5. The nano-imprint mold according to claim 1, wherein the elastic body is composed of a double coated adhesive tape, the double coated adhesive tape includes an elastic film and an adhesive material on both sides of the film, and the elastic film is composed of at least one of polyethylene terephthalate, polyethylene, and polypropylene.

6. The nano-imprint mold according to claim 1, wherein a thickness of the mold body from the first surface to the second surface is in the range of 0.1 mm to 0.5 mm.

7. The nano-imprint mold according to claim 1, wherein the mold base and the mold body are composed of quartz or synthetic quartz.

8. The nano-imprint mold according to claim 1, wherein the resin constituting the elastic body contains at least one of polyethylene terephthalate, polyethylene, and polypropylene.

9. The nano-imprint mold according to claim 1, wherein the elastic body has a bulk modulus in the range of $1 \times 10^9$ Pa to $1 \times 10^{10}$ Pa.

10. The nano-imprint mold according to claim 1, wherein the nano-imprint pattern formed in the second surface of the mold body is a diffraction grating pattern having periodic projections and recesses.

* * * * *